(12) United States Patent
Wang et al.

(10) Patent No.: US 12,562,651 B2
(45) Date of Patent: Feb. 24, 2026

(54) RESONANT CONVERTER AND SYNCHRONOUS RECTIFICATION CONTROL METHOD THEREOF

(71) Applicant: ECOFLOW INC., Shenzhen (CN)

(72) Inventors: Lei Wang, Shenzhen (CN); Wenping Tong, Shenzhen (CN)

(73) Assignee: ECOFLOW INC., Shenzhen (CN)

( * ) Notice: Subject to any disclaimer, the term of this patent is extended or adjusted under 35 U.S.C. 154(b) by 302 days.

(21) Appl. No.: 18/476,814

(22) Filed: Sep. 28, 2023

(65) Prior Publication Data

US 2024/0022177 A1     Jan. 18, 2024

Related U.S. Application Data

(63) Continuation of application No. PCT/CN2021/111126, filed on Aug. 6, 2021.

(30) Foreign Application Priority Data

Mar. 29, 2021     (CN) .......................... 202110329923.1

(51) Int. Cl.
| | |
|---|---|
| *H02M 3/335* | (2006.01) |
| *H02M 1/00* | (2007.01) |
| *H02M 3/00* | (2006.01) |

(52) U.S. Cl.
CPC ..... *H02M 3/33592* (2013.01); *H02M 1/0032* (2021.05); *H02M 1/0058* (2021.05); *H02M 3/01* (2021.05); *H02M 3/33573* (2021.05)

(58) Field of Classification Search
None
See application file for complete search history.

(56) References Cited

U.S. PATENT DOCUMENTS 5,920,475 A  *  7/1999  Boylan ............. H02M 3/33584
                                                    323/239
10,250,126 B1     4/2019  Chen et al.
                  (Continued)

FOREIGN PATENT DOCUMENTS

CN        101728958 A     6/2010
CN        102437750 A     5/2012
                  (Continued)

OTHER PUBLICATIONS

"A 6.78-MHz Single-Stage Regulating Rectifier with Hysteretic Control and Current-Wave Modulation", 2020 IEEE Asian Solid-State Circuits Conference (A-SSCC), Nov. 9, 2020, pp. 1-2, (Year: 2020).*

(Continued)

*Primary Examiner* — Crystal L Hammond
*Assistant Examiner* — Jennifer C Caulk
(74) *Attorney, Agent, or Firm* — ANOVA LAW GROUP, PLLC

(57) ABSTRACT

A synchronous rectification control method for a resonant converter includes: obtaining an output current of the resonant converter; obtaining a first parameter if the output current is greater than a first current threshold; obtaining a second parameter if the output current is less than a second current threshold, the first current threshold being greater than the second current threshold, and the first parameter being greater than the second parameter; establishing a first current hysteresis loop according to the first parameter and establishing a second current hysteresis loop according to the second parameter, a parameter of the first current hysteresis loop being the first parameter, and a parameter of the second current hysteresis loop being the second parameter; and using the first current hysteresis loop and the second current hysteresis loop to control synchronous rectification (Continued)

of the resonant converter in a load switching working condition.

14 Claims, 4 Drawing Sheets

(56)                    References Cited

U.S. PATENT DOCUMENTS

| | | | | |
|---|---|---|---|---|
| 10,938,309 | B1 * | 3/2021 | Malechek | ......... H02M 3/33584 |
| 2015/0070956 | A1 | 3/2015 | Mu et al. | |
| 2020/0204080 | A1 * | 6/2020 | Zhang | ................. H02M 3/1588 |

FOREIGN PATENT DOCUMENTS

| | | | | |
|---|---|---|---|---|
| CN | 103326580 A | | 9/2013 | |
| CN | 110492724 A | * | 11/2019 | ........ H02M 3/33523 |
| CN | 112713782 A | | 4/2021 | |

OTHER PUBLICATIONS

The World Intellectual Property Organization (Wipo) International Search Report for PCT/CN2021/111126 Nov. 26, 2021 5 Pages (with translation).

The European Patent Office (EPO) Communication from the Examining Division for Application No. 21826699.7, Jan. 3, 2025 5 Pages.

Jie Lin et al., "A 6.78-MHz single-stage wireless power receiver with ultrafast transient response using hysteretic control and multilevel current-wave modulation." IEEE Transactions on Power Electronics 36.9 (2021): 9918-9926.

Jie Lin et al., "A 6.78-MHz single-stage regulating rectifier with hysteretic control and current-wave modulation." 2020 IEEE Asian Solid-State Circuits Conference (A-SSCC). IEEE, 2020.

The European Patent Office (EPO) The Extended European Search Report for 21826699.7, May 2, 2024 9 Pages.

* cited by examiner

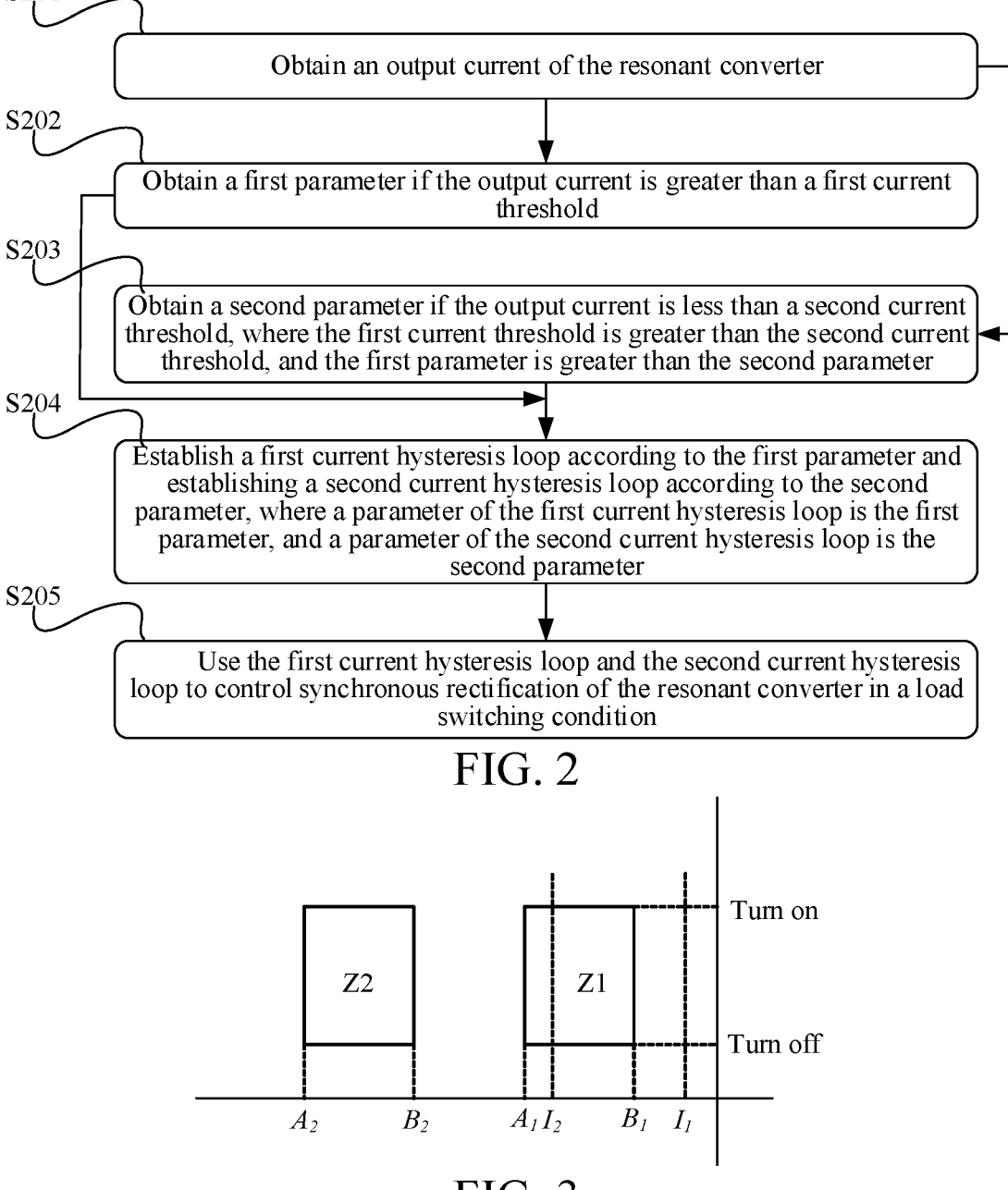

S201

Obtain an output current of the resonant converter

S202

Obtain a first parameter if the output current is greater than a first current threshold

S203

Obtain a second parameter if the output current is less than a second current threshold, where the first current threshold is greater than the second current threshold, and the first parameter is greater than the second parameter

S204

Establish a first current hysteresis loop according to the first parameter and establishing a second current hysteresis loop according to the second parameter, where a parameter of the first current hysteresis loop is the first parameter, and a parameter of the second current hysteresis loop is the second parameter

S205

Use the first current hysteresis loop and the second current hysteresis loop to control synchronous rectification of the resonant converter in a load switching condition

FIG. 2

Turn on

Turn off

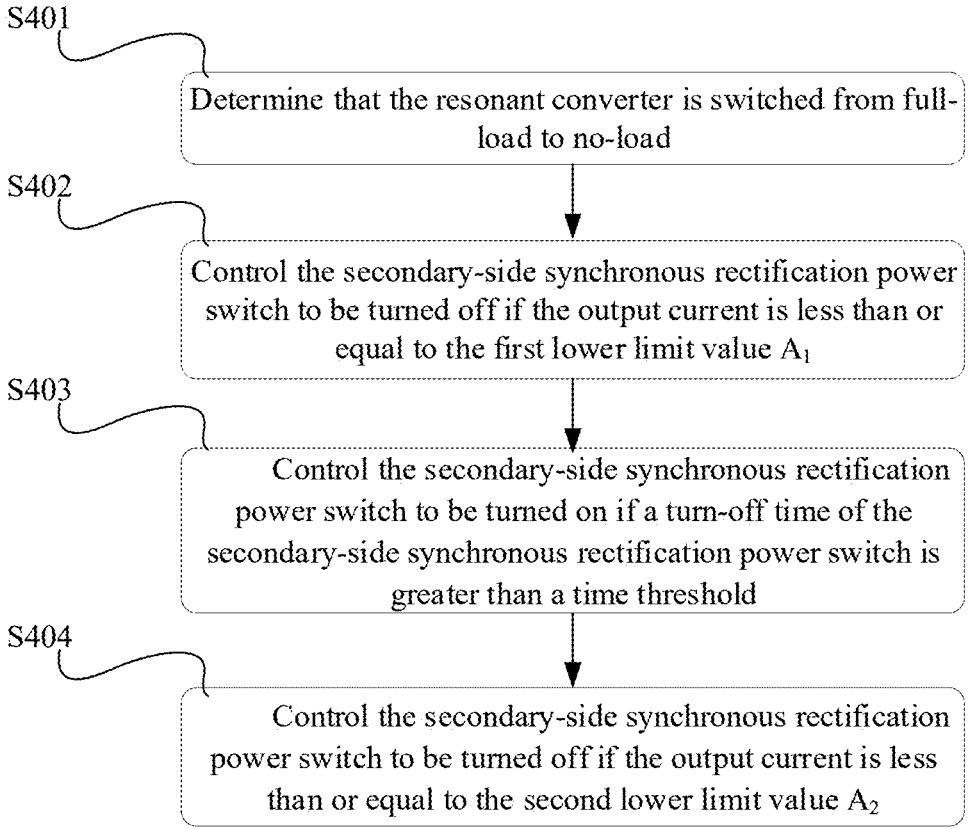

S401

Determine that the resonant converter is switched from full-load to no-load

S402

Control the secondary-side synchronous rectification power switch to be turned off if the output current is less than or equal to the first lower limit value $A_1$

S403

Control the secondary-side synchronous rectification power switch to be turned on if a turn-off time of the secondary-side synchronous rectification power switch is greater than a time threshold

S404

Control the secondary-side synchronous rectification power switch to be turned off if the output current is less than or equal to the second lower limit value $A_2$

FIG. 4

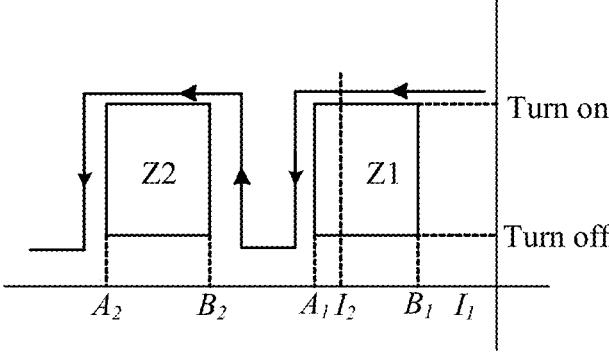

Turn on

Turn off $A_2$     $B_2$     $A_1 I_2$     $B_1$     $I_1$

FIG. 5

RESONANT CONVERTER AND SYNCHRONOUS RECTIFICATION CONTROL METHOD THEREOF

CROSS-REFERENCE TO RELATED APPLICATIONS

This application is a continuation application of PCT patent application No. PCT/CN2021/111126, filed on Aug. 6, 2021, which claims priority to Chinese Patent Application No. 202110329923.1, filed on Mar. 29, 2021, all of which is incorporated herein by reference in their entirety.

TECHNICAL FIELD

This application relates to the field of converters, and in particular, to a resonant converter and a synchronous rectification control method thereof.

BACKGROUND

The description herein provides only background information related to this application, but does not necessarily constitute the exemplary technology.

In the resonant converter technology; a method of adjusting a bus voltage function is usually used to resolve the problem of over-derating of a Vds voltage of a secondary-side synchronous rectification power switch in a steady state, but the method cannot resolve the problem of over-derating of the Vds voltage of the secondary-side synchronous rectification power switch in a dynamic process. For example, a power of a resonant converter is increased from 7.5 KW to 10 KW, an output rated current of the resonant converter is increased from 75 A to 100 A, and a current limit is 110% (110 A). In a working condition of switching from full-load to no-load, a voltage spike of the secondary-side synchronous rectification power switch can reach up to 290 V, and the problem of over-derating is serious.

In the prior art, generally, a current determination threshold is increased (synchronous rectification quickly exits) in order to improve the problem of over-derating, but the power consumption is increased.

SUMMARY

According to various embodiments of this application, a resonant converter and a synchronous rectification control method thereof are provided.

A synchronous rectification control method for a resonant converter includes: obtaining an output current of the resonant converter: obtaining a first parameter if the output current is greater than a first current threshold: obtaining a second parameter if the output current is less than a second current threshold, the first current threshold being greater than the second current threshold, and the first parameter being greater than the second parameter; establishing a first current hysteresis loop according to the first parameter and establishing a second current hysteresis loop according to the second parameter, a parameter of the first current hysteresis loop being the first parameter, and a parameter of the second current hysteresis loop being the second parameter; and using the first current hysteresis loop and the second current hysteresis loop to control synchronous rectification of the resonant converter in a load switching working condition.

A synchronous rectification control method for a resonant converter includes:

obtaining an output current of the resonant converter;

obtaining a first parameter if the output current is greater than a first current threshold;

obtaining a second parameter if the output current is less than a second current threshold, the first current threshold being greater than the second current threshold, and the first parameter being greater than the second parameter;

establishing a first current hysteresis loop according to the first parameter and establishing a second current hysteresis loop according to the second parameter, a parameter of the first current hysteresis loop being the first parameter, and a parameter of the second current hysteresis loop being the second parameter, where the first parameter includes a first lower limit value and a first upper limit value, and the second parameter includes a second upper limit value and a second lower limit value, the first lower limit value being less than the second current threshold;

using the first current hysteresis loop and the second current hysteresis loop to control synchronous rectification of the resonant converter in a load switching working condition;

sequentially using the first current hysteresis loop and the second current hysteresis loop to control a secondary-side synchronous rectification power switch of the resonant converter to work, if the resonant converter is switched from full-load to no-load; controlling the secondary-side synchronous rectification power switch to be turned off if the output current is less than or equal to the first lower limit value; controlling the secondary-side synchronous rectification power switch to be turned on if a turn-off time of the secondary-side synchronous rectification power switch is greater than a time threshold; since there is a delay in switching from the first current hysteresis loop to the second current hysteresis loop, in a region between the first lower limit value and the second upper limit value, first turning off the secondary-side synchronous rectification power switch, then turning on the secondary-side synchronous rectification power switch after a delay of a preset duration, and entering the control of the second current hysteresis loop; and controlling the secondary-side synchronous rectification power switch to be turned off if the output current is less than or equal to the second lower limit value;

sequentially using the second current hysteresis loop and the first current hysteresis loop to control the secondary-side synchronous rectification power switch of the resonant converter to work, if the resonant converter is switched from no-load to full-load; and when the resonant converter is in a working condition of switching from no-load to full-load, controlling the secondary-side synchronous rectification power switch to be turned on if the output current is greater than or equal to the second upper limit value; and with a change of the output current, still controlling the secondary-side synchronous rectification power switch to be turned on if the output current is greater than or equal to the first upper limit value.

A resonant converter performs synchronous rectification control by the synchronous rectification control method.

Details of one or more embodiments of this application are provided in the accompanying drawings and descriptions below: Other features, objectives, and advantages of this application become apparent from the specification, the accompanying drawings, and the claims.

BRIEF DESCRIPTION OF THE DRAWINGS

To describe the technical solutions in the embodiments of this application or in the prior art more clearly, the accompanying drawings required for describing the embodiments are briefly described below: Apparently, the accompanying drawings in the following description show merely some embodiments of this application, and a person of ordinary skill in the art may still derive other drawings from these accompanying drawings without creative efforts.

FIG. 2 is a schematic flowchart of an embodiment of a synchronous rectification control method for a resonant converter according to this application.

FIG. 3 is a schematic diagram of a hysteresis loop curve of a first current hysteresis loop and a second current hysteresis loop according to this application.

FIG. 4 is a specific schematic flowchart of step S205 in a synchronous rectification control method for a resonant converter in an embodiment shown in FIG. 2.

FIG. 5 is a schematic diagram of a hysteresis loop curve of a first current hysteresis loop and a second current hysteresis loop and an on/off state of a secondary-side synchronous rectification power switch of a resonant converter according to this application in a load switching working condition.

DETAILED DESCRIPTION

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms "first" and "second" in this application are used merely for descriptive purposes, and shall not be construed as indicating or implying relative importance or implicitly indicating the number of technical features indicated. In description of this application, "more" means at least two, such as two and three unless it is specifically defined otherwise. In addition, the terms "include", "have", and any variant thereof are intended to cover a non-exclusive inclusion. For example, a process, method, system, product, or device that includes a series of steps or units is not limited to the listed steps or units, but further optionally includes a step or unit that is not listed, or further optionally includes another step or unit that is intrinsic to the process, method, product, or device.

Figures 1A, 1B:
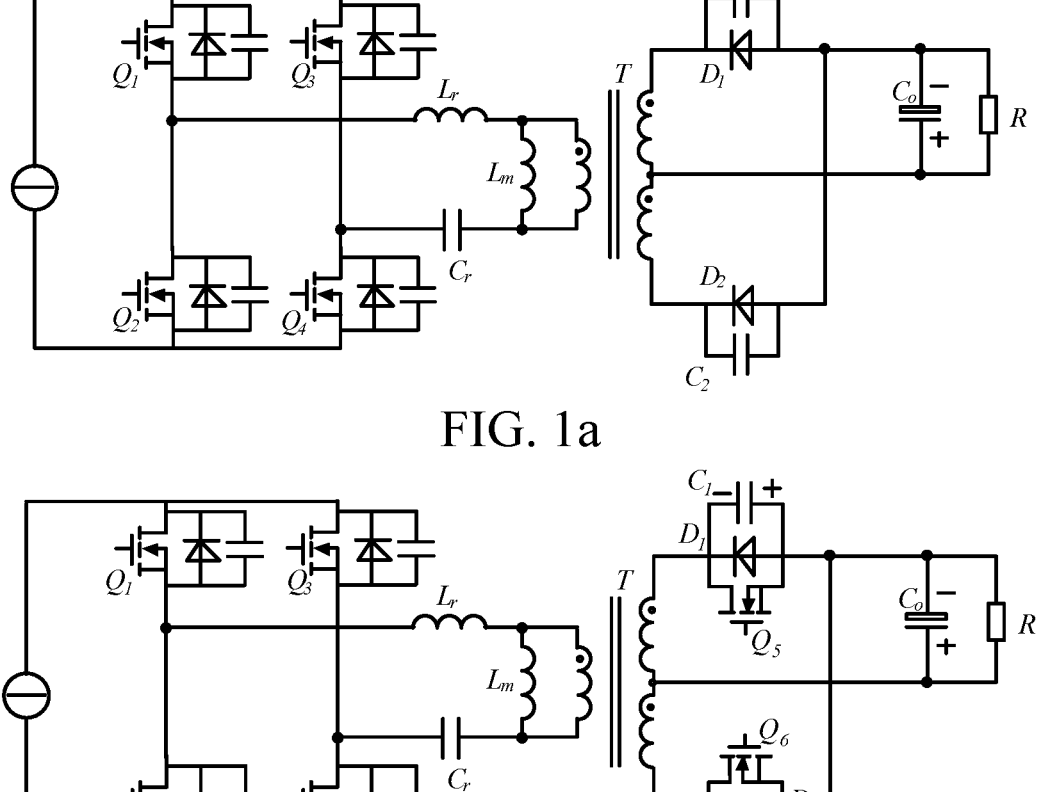
FIG. 1a is a schematic structural diagram of a simple circuit of a resonant converter according to this application.
FIG. 1b is a schematic structural diagram of a detailed circuit of a resonant converter according to this application.

This application first proposes a resonant converter. As shown in FIG. 1a, the resonant converter is a resonant circuit that implements a constant output voltage by controlling a switching frequency (adjusting the frequency). Advantages of the resonant converter are as follows: zero voltage switch (Zero Voltage Switch, ZVS) of original-side main MOS switches ($Q_1$ to $Q_4$) and zero current switch (Zero Current Switch, ZCS) of secondary-side synchronous rectification diodes ($D_1$, $D_2$) are implemented, and through the soft switching technology, the switching loss can be reduced, and the efficiency and power density of the resonant converter can be improved. The synchronous rectification diodes ($D_1$, $D_2$) shown in FIG. 1a are parasitic diodes of a secondary-side synchronous rectification power switch. In FIG. 1a, the secondary-side synchronous rectification power switch is omitted, and only the parasitic diodes ($D_1$, $D_2$) and parasitic capacitors ($C_1$, $C_2$) are schematically shown.

As shown in FIG. 1b, the resonant converter according to this embodiment includes a switching network (not shown), a resonant network (not shown), a central tap transformer T, a secondary-side synchronous rectification power switch $Q_5$, a parasitic diode $D_1$ and a parasitic capacitor $C_1$ inside the secondary-side synchronous rectification power switch $Q_5$, a secondary-side synchronous rectification power switch $Q_6$, a parasitic diode $D_2$ and a parasitic capacitor $C_2$ inside the secondary-side synchronous rectification power switch $Q_6$, an output filter capacitor $C_0$, a load R, and the like. The switching network includes the main MOS switches ($Q_1$ to $Q_4$), and parasitic diodes (not shown) and parasitic capacitors (not shown) inside the main MOS switches ($Q_1$ to $Q_4$). The resonant network includes a resonant capacitor $C_r$, a series resonant inductor $L_r$, and a parallel resonant inductor $L_m$.

In another embodiment, the resonant converter may alternatively be a half-bridge resonant converter or the like.

The resonant converter according to this application can use the following synchronous rectification control method to implement synchronous rectification control, to reduce a voltage spike and reduce the power consumption.

This application further proposes a synchronous rectification control method for a resonant converter. As shown in FIG. 2 and FIG. 3, FIG. 2 is a schematic flowchart of an embodiment of the synchronous rectification control method for a resonant converter according to this application, and FIG. 3 is a schematic diagram of a hysteresis loop curve of a first current hysteresis loop and a second current hysteresis loop according to this application. The synchronous rectification control method for a resonant converter according to this embodiment specifically includes the following steps.

Step S201: Obtain an output current of the resonant converter.

The output current of the resonant converter refers to an output current of a secondary-side synchronous rectification power switch, and the output current can be obtained through a current collection circuit.

Step S202: Obtain a first parameter if the output current is greater than a first current threshold $I_1$.

The output current is compared with the first current threshold $I_1$, and the first parameter is obtained if the output current is greater than the first current threshold $I_1$. An obtaining method for the first parameter is described below: The first parameter includes a first lower limit value $A_1$ and a first upper limit value $B_1$.

Step S203: Obtain a second parameter if the output current is less than a second current threshold $I_2$, where the first current threshold $I_1$ is greater than the second current threshold $I_2$, and the first parameter is greater than the second parameter.

The output current is compared with the second current threshold $I_2$, and the second parameter is obtained if the output current is less than the second current threshold $I_2$. An obtaining method for the second parameter is described below. The second parameter includes a second lower limit value $A_2$ and a second upper limit value $B_2$.

Step S204: Establish a first current hysteresis loop Z1 according to the first parameter and establish a second current hysteresis loop Z2 according to the second parameter, where a parameter of the first current hysteresis loop Z1 is the first parameter, and a parameter of the second current hysteresis loop Z2 is the second parameter.

In this embodiment, a current double hysteresis loop can be established for the synchronous rectification control of the secondary-side synchronous rectification power switch by steps S202 to S204. Moreover, in this embodiment, the first current threshold $I_1$ is greater than the second current threshold $I_2$, and the first parameter is greater than the second parameter, that is, an output current corresponding to the first current hysteresis loop Z1 is greater than an output current corresponding to the second current hysteresis loop Z2.

Optionally, the first lower limit value $A_1$ of the first current hysteresis loop Z1 according to this embodiment is less than the second current threshold $I_2$, which can avoid the occurrence of a turn-on blind area of the secondary-side synchronous rectification power switch.

In this embodiment, assignment of the first parameter of the first current hysteresis loop Z1 and the second parameter of the second current hysteresis loop Z2 can be implemented through the following program:

If $(I_0 > I_1)$
{
A=$A_1$;
B=$B_1$;}
else if $(I_0 < I_2)$
{
A=$A_2$;
B=$B_2$;|
}

In the above program, $I_0$ refers to the output current of the secondary-side synchronous rectification power switch, and A and B refer to current values for controlling the turn on/off of the secondary-side synchronous rectification power switch.

In this embodiment, the above assignment order of the first parameter of the first current hysteresis loop Z1 and the second parameter of the second current hysteresis loop Z2 can avoid interruption of insertion.

Step S205: Use the first current hysteresis loop Z1 and the second current hysteresis loop Z2 to control synchronous rectification of the resonant converter in a load switching working condition.

In an application scenario, if the resonant converter is switched from full-load to no-load, the secondary-side synchronous rectification power switch of the resonant converter is controlled to work by sequentially using the first current hysteresis loop Z1 and the second current hysteresis loop Z2.

Specifically, based on a hysteresis loop curve of a current double hysteresis loop according to the embodiment of FIG. 3, a method according to an embodiment of FIG. 4 can be used to implement the synchronous rectification of the resonant converter in a working condition of switching from full-load to no-load. The method according to this embodiment includes steps S401 to S403.

Step S401: Determine that the resonant converter is switched from full-load to no-load.

If it is detected that the output current drops rapidly, it is determined that the resonant converter is switched from full-load to no-load.

Step S402: Control the secondary-side synchronous rectification power switch to be turned off if the output current is less than or equal to the first lower limit value $A_1$.

As shown in FIG. 5, if the resonant converter is switched from full-load to no-load, the output current of the secondary-side synchronous rectification power switch is obtained; and if the output current is less than or equal to the first lower limit value $A_1$, the secondary-side synchronous rectification power switch is controlled to be turned off.

Step S403: Control the secondary-side synchronous rectification power switch to be turned on if a turn-off time of the secondary-side synchronous rectification power switch is greater than a time threshold.

Since there is a delay in switching from the first current hysteresis loop Z1 to the second current hysteresis loop Z2, in a region between $A_1$ and $B_2$, the secondary-side synchronous rectification power switch is first turned off, and then turned on after a delay of a preset duration, to enter the control of the second current hysteresis loop Z2.

The time threshold is less than or equal to a switching determination duration of the first current hysteresis loop Z1 and the second current hysteresis loop Z2, that is, a difference between the first lower limit value $A_1$ and the second upper limit value $B_2$. In addition, the switching determination duration should be greater than or equal to twice a current switching duration.

In an application scenario, the switching determination duration may be 5 ms, and a switching duration of the output current from 100 A to 0 A may be 500 μs.

Step S404: Control the secondary-side synchronous rectification power switch to be turned off if the output current is less than or equal to the second lower limit value $A_2$.

The output current of the secondary-side synchronous rectification power switch is obtained, and if the output current is less than or equal to the second lower limit value $A_2$, the secondary-side synchronous rectification power switch is controlled to be turned off.

When the output current drops rapidly (from full-load to no-load), the resonant converter first works in the first current hysteresis loop Z1 to implement the rapid turn-off of the secondary-side synchronous rectification power switch. After about 5 ms, the resonant converter works in the second current hysteresis loop Z2.

When the resonant converter is switched from full-load to no-load, the resonant converter first works in the first current hysteresis loop Z1 to implement the rapid turn-off of the secondary-side synchronous rectification power switch, which can reduce a voltage spike of the secondary-side synchronous rectification power switch. After a delay, the secondary-side synchronous rectification power switch is turned on again, and the synchronous rectification is controlled by the second current hysteresis loop Z2, so that the exit of the synchronous rectification can be delayed, thereby reducing the power consumption.

In another application scenario, if the resonant converter is switched from no-load to full-load, the secondary-side synchronous rectification power switch of the resonant converter is controlled to work by sequentially using the second current hysteresis loop Z2 and the first current hysteresis loop Z1.

Specifically, when the resonant converter is in a working condition of switching from no-load to full-load, the secondary-side synchronous rectification power switch is controlled to be turned on if the output current is greater than or equal to the second upper limit value $B_2$; and with a change of the output current, the secondary-side synchronous rectification power switch is still controlled to be turned on if the output current is greater than or equal to the first upper limit value $B_1$.

When the output current rises rapidly (the resonant converter is switched from no-load to full-load), the resonant converter first works in the second current hysteresis loop $Z2$, and after about 5 ms, the resonant converter works in the first current hysteresis loop $Z1$.

Optionally, the synchronous rectification control method for a resonant converter according to this embodiment can further be used for synchronous rectification control in a non-load-switching working condition. For example, if the resonant converter is in the non-load-switching working condition, is used to control the secondary-side synchronous rectification power switch of the resonant converter is controlled to work by using the second current hysteresis loop $Z2$.

Figure 6:
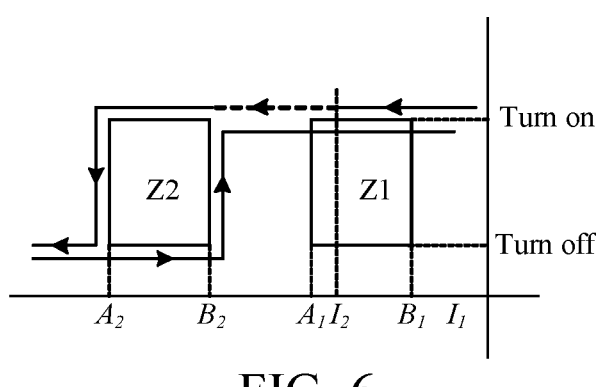
FIG. 6 is a schematic diagram of a hysteresis loop curve of a first current hysteresis loop and a second current hysteresis loop and an on/off state of a secondary-side synchronous rectification power switch of a resonant converter according to this application in a non-load-switching working condition.

Specifically, in the non-load-switching working condition (the output current changes slowly), as shown in FIG. 6, if the output current is less than or equal to the second lower limit value $A_2$, the secondary-side synchronous rectification power switch is controlled to be turned off, and if the output current is greater than or equal to the second upper limit value $B_2$, the secondary-side synchronous rectification power switch is controlled to be turned on.

In the process of synchronous rectification control, the output current shall be obtained in real time, and the above determination and control shall be performed using the real-time output current.

In this embodiment, the speed of the driving and exit of the secondary-side synchronous rectification during load switching can be increased by shortening a sampling determination duration of the output current, so as to reduce the voltage spike. For example, the sampling determination duration of the output current may be shortened from 160 µs to 10 µs.

In another embodiment, the speed of the driving and exit of the secondary-side synchronous rectification during load switching can alternatively be increased by increasing a current determination threshold of the output current, so as to reduce the voltage spike.

In this application, the feasibility of the current double hysteresis loop (the first current hysteresis loop $Z1$ and the second current hysteresis loop $Z2$) according to this application can be verified and the parameters of the current double hysteresis loop can be determined by the following method.

The verification environment is as follows:

Oscilloscope model: Agilent DSO3034A 350 MHz;

Probe model: voltage probe Tektronix TPP0101 10×, isolation probe TEK P5200A 50 MHz, current test probe TEK TCPA300, current test probe TEK TCPA303; and Module board: R752A072M11 PCB: V8.0; PFC_MOS: TK39N60W; PFC_DIO: APT30DQ120; DCDC_MOS: TK39N60W5; SR_MOS: IRFP4768 (IR Company), a breakdown voltage of the device is 250 V (working in an extreme transient region and required to satisfy avalanche derating requirements).

The parameters of the current double hysteresis loop in a case that the sampling determination duration of the output current is 10 µs are determined.

First, the first lower limit value $A_1$ and the first upper limit value $B_1$ are determined, that is, the value to which the current determination threshold for turning on or turning of the secondary-side synchronous rectification power switch is increased satisfies the requirement that the voltage stress is not over-derating. Different first parameters ($B_1$, $A_1$) are set to perform a test by switching from full-load (99.3 V/102.5 A, current limit mode) to no-load; first test parameters: $B_1$=70 A, $A_1$=65 A: second test parameters: $B_1$=80 A, $A_1$=75 A. In this application, a selected component has a derating design, and a case in which the component is beyond the derating design thereof during use is called over-derating.

In a case of $B_1$=70 A and $A_1$=65 A, the voltage stress of the secondary-side synchronous rectification power switch is up to 275 V, which does not satisfy the requirement. In a case of $B_1$=80 A and $A_1$=75 A, the voltage stress of the secondary-side synchronous rectification power switch is up to 245V, which satisfies the requirement. Thus, the parameters are determined to be $B_1$=80 A and $A_1$=75 A.

In order to ensure that there is no turn-on blind area of the secondary-side synchronous rectification power switch, it is necessary to satisfy the requirement of $A_1 < I_2$, and thus it is set that $I_2$=78 A. $I_1$ may be larger than $I_2$, and $I_1$=$I_2$+5 A=83 A may be configured here. The current determination threshold of the exit of the secondary-side synchronous rectification power switch may be set as: $A_1$−5 A=70 A ($Z1$) and $A_2$−5 A=10 A ($Z2$), and the specific values thereof can be adjusted according to an actual working condition.

In order to further evaluate the feasibility of the current double hysteresis loop, the voltage stress, steady current precision and load adjustment rate of the secondary-side synchronous rectification power switch are re-tested.

a) the voltage stress of the secondary-side synchronous rectification power switch when switching from full-load to no-load. Test working conditions: (1) switching from full-load 99.3 V/102 A (entering current limit) to no-load, which is a worst working condition in the test: (2) switching from 100 V/81.6 A to no-load, which is a working condition of only working in the second hysteresis loop $Z2$. Test method: cycling the load-switching for 50 times, and taking a maximum value of the voltage spike of the secondary-side synchronous rectification power switch. Test results are as follows:

| Test working condition | $Q_5$ | $Q_6$ |
|---|---|---|
| Switching from 99.3 V/102 A to no-load | 245 V | 243 V |
| Switching from 100 V/81.6 A to no-load | 279 V | 261 V |

When switching from full-load 99.3 V/102 A to no-load, the maximum value of voltage spike is 247 V, which does not exceed the derating of the device, but when switching from 100 V/81.6 A to no-load, the maximum value of the voltage spike is 279 V, which largely exceeds the breakdown voltage (250 V) of the device. In this working condition, the resonant converter works in the second current hysteresis loop $Z2$, the current determination threshold is small, and thus the parameter of the second current hysteresis loop $Z2$ is increased by 13 A (in order to ensure the light load efficiency, the current cannot be increased excessively high) to improve the voltage spike of the secondary-side synchronous rectification power switch when the resonant converter only works in the second current hysteresis loop $Z2$. New parameters of the current double hysteresis loop are set as: $A_2$=23 A, $B_2$=28 A, $A_1$=75 A, $B_1$=80 A, $I_2$=78 A, and $I_1$=83 A.

The voltage stress in the load switching working condition with the new parameters of the current double hysteresis loop is re-tested. Test working conditions: (1) switching from full-load 99.3 V/102 A (entering current limit) to no-load, (2) switching from with-load 100 V/96 A to no-load, (3) switching from with with-load 100 V/81.6 A to no-load, (4) switching from with-load 100 V/75 A to no-load. Results of the test are as follows:

| Test working condition | $Q_5$ | $Q_6$ |
| --- | --- | --- |
| Switching from 99.3 V/102 A to no-load | 249 V | 249 V |
| Switching from 100 V/96 A to no-load | 241 V | 237 V |
| Switching from 100 V/81.6 A to no-load | 253 V | 245 V |
| Switching from 100 V/75 A to no-load | 247/257 V | 239 V |

In the test working conditions (1) and (2), the resonant converter works in the current double hysteresis loop, the rapid turn-off of the secondary-side synchronous rectification power switch can be implemented, the maximum voltage stress in the test is 249 V, and the full-load device derates: in the test working conditions (3) and (5), the resonant converter only works in the second current hysteresis loop Z2, the maximum voltage stress in the test is 257 V, which exceeds the breakdown voltage of the device by 7 V, but the probability of the occurrence of the over-derating spike is about one-fifth, and there is only one pulse.

In order to evaluate the reliability of the work of the resonant converter, the evaluation is performed from the perspective of avalanche breakdown. A measured Vds voltage spike is 261 V (which is slightly larger than the actual one due to a wire connected in series for current measurement), and the time during an avalanche is 14 ns. Since the voltage spike occurs after an output current $I_O$ drops to zero, a drain current is very small and a value of 1 A is taken here.

An avalanche energy is set as $E_{AR}=1.8$ μJ, which is much lower than 770 mJ given in a device manual. Therefore, in the test working conditions (3) and (4), although the Vds voltage spike exceeds the breakdown voltage of the device, the resonant converter works in the extreme transient region, and the avalanche energy is very small, which satisfies the derating requirement of the device.

b) Steady Current Precision

The steady current precision of the resonant converter in conditions of 20%, 25%, 50%, and 100% current limit is tested, and test results satisfy the requirement that the steady current precision reaches 1% at each current limit point.

c) Load Adjustment Rate

The load adjustment rates of the resonant converter in working conditions of outputting 100 V. 81 V. 70 V and 50 V are respectively tested. The test results satisfy that in a case of having different load, a direct current output voltage and the output current have negative monotonicity, and a difference between the direct current output voltage and an output voltage setting value should be less than or equal to ±0.5% of the output voltage setting value.

d) In a case of using the current double hysteresis loop, when the load is switched from a large current (>$A_1$) to an interval ($B_2$ to $A_1$), the synchronous rectification is first turned off and then turned on.

The experimental test results show that, according to a theoretical analysis, when a SR drive waveform and the output current $I_O$ are set to be switched from the large current (>$A_1$) to the interval ($B_2$ to $A_1$), the drive is turned off and then turned on. The reason is that a delay is required for switching from the first current hysteresis loop Z1 to the second current hysteresis loop Z2, and the delay is about 300 ms (mainly, the current for the hysteresis loop switching determination is a display current, and there is no much requirement for speed here). This situation has no effect on normal work of the resonant converter, and additionally indicates that the current double hysteresis loop plays a role.

In this application, the synchronous rectification is controlled through the current double hysteresis loop, so that the exit speed of the secondary-side synchronous rectification power switch when switching from full-load to no-load can be accelerated without affecting the turn-on and turn-off of the secondary-side synchronous rectification power switch when the resonant converter works normally, thereby resolving the problem that the voltage stress of the secondary-side synchronous rectification power switch when switching from full-load to no-load is over-derating. The parameters of the current double hysteresis loop are set as: $A_2=23$ A, $B_2=28$ A, $A_1=75$ A, $B_1=80$ A, $I_2=78$ A, and $I_1=83$ A. Although it is not in a working condition of switching from full-load to no-load, and the voltage stress of the secondary-side synchronous rectification power switch exceeds the breakdown voltage by 7 V, the voltage spike duration is very short, the current flowing through the device is small, and the avalanche energy is very low, which satisfies the device derating requirement. After testing, by adding the current double hysteresis loop to perform control, the steady current precision and load adjustment rate of the resonant converter both satisfy the requirement.

This application further proposes a computer storage medium, storing a program instruction, the program instruction, when executed by a processor, implementing the synchronous rectification control method for a resonant converter.

The computer storage medium according to this embodiment may be, but is not limited to, a USB disk, a SD card, a PD optical drive, a mobile hard disk, a large-capacity floppy drive, a flash memory, a multimedia memory card, a server, or the like.

Different from the prior art, the synchronous rectification control method for a resonant converter according to this application includes: obtaining an output current of the resonant converter; obtaining a first parameter if the output current is greater than a first current threshold; obtaining a second parameter if the output current is less than a second current threshold, the first current threshold being greater than the second current threshold, and the first parameter being greater than the second parameter; establishing a first current hysteresis loop and a second current hysteresis loop based on the first parameter and the second parameter, a parameter of the first current hysteresis loop being the first parameter, and a parameter of the second current hysteresis loop being the second parameter; and using the first current hysteresis loop and the second current hysteresis loop to control synchronous rectification of the resonant converter in a load switching working condition. In this manner, in this application, the first current hysteresis loop and the second current hysteresis loop are established, the first current hysteresis loop and the second current hysteresis loop are used to control the synchronous rectification of the resonant converter in the load switching working condition, and the first parameter of the first current hysteresis loop is greater than the second parameter of the second current hysteresis loop. Therefore, the voltage spike of the secondary-side synchronous rectification power switch of the resonant converter can be reduced by the first current hysteresis loop, and the power consumption of the resonant converter can be reduced by the second current hysteresis loop, so that the spike voltage and the power consumption can be reduced in this application.

In addition, if the above functions are implemented in the form of software functions and are sold or used as independent products, the functions may be stored in a mobile terminal or readable storage medium. That is, this application further provides a storage apparatus storing program data, and the program data can be executed to implement the method according to the above embodiments. The storage apparatus may be a USB disk, an optical disk, a server, or the like. That is, this application may be embodied in the form of a software product that includes several instructions to cause a smart terminal to perform all or part of the steps of the method according to the embodiments.

In the descriptions of this application, the description of a reference term such as "an embodiment", "some embodiments", "an example", "a specific example", or "some examples" means that a specific feature, structure, material, or characteristic that is described with reference to the embodiment or example is included in at least one embodiment or example of this application. In this specification, schematic descriptions of the above terms are not necessarily directed at the same embodiment or example. Moreover, the specific feature, structure, material, or characteristic described may be combined in any one or more embodiments or examples in a suitable manner. In addition, a person skilled in the art may integrate or combine different embodiments or examples described in this specification and features of the different embodiments or examples as long as they are not contradictory to each other.

In addition, the terms "first" and "second" are used merely for descriptive purposes, and shall not be construed as indicating or implying relative importance or implicitly indicating the number of technical features indicated. Therefore, features defined by "first" and "second" can explicitly or implicitly include at least one of the features. In the description of this application, "more" means at least two, such as two and three unless it is specifically defined otherwise.

Any process or method in the flowcharts or described herein in another manner may be understood as indicating a module, a segment, or a part including code of one or more executable instructions for implementing a particular logical function or process step. In addition, the scope of preferred embodiments of this application include other implementations which do not follow the order shown or discussed, including performing, according to involved functions, the functions basically simultaneously or in a reverse order, which is to be understood by technical personnel in the technical field to which the embodiments of this application belong.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (may be a personal computer, a server, a network device, or another system that can obtain an instruction from the instruction execution system, apparatus, or device and execute the instruction) or to be used by combining such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More specific examples (a non-exhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disc read-only memory (CDROM). In addition, the computer-readable medium can even be paper or other suitable medium on which the program can be printed, because the program can be obtained electronically by, for example, optically scanning paper or other medium, then editing, interpreting, or processing in other suitable ways if necessary, and then storing it in a computer memory.

The above descriptions are merely implementations of this application, and the protection scope of this application is not limited thereto. All equivalent structure or process changes made according to the content of this specification and accompanying drawings in this application or by directly or indirectly applying this application in other related technical fields shall fall within the protection scope of this application.

What is claimed is:

1. A synchronous rectification control method for a resonant converter, the method comprising:

obtaining an output current of the resonant converter;

obtaining a first parameter if the output current is greater than a first current threshold;

obtaining a second parameter if the output current is less than a second current threshold, the first current threshold being greater than the second current threshold, and the first parameter being greater than the second parameter;

establishing a first current hysteresis loop according to the first parameter and establishing a second current hysteresis loop according to the second parameter; and using the first current hysteresis loop and the second current hysteresis loop to control synchronous rectification of the resonant converter in a load switching working condition, wherein the first parameter comprises a first lower limit value and a first upper limit value, and the second parameter comprises a second upper limit value and a second lower limit value, the first lower limit value being less than the second current threshold.

2. The synchronous rectification control method according to claim 1, wherein using the first current hysteresis loop and the second current hysteresis loop to control the synchronous rectification of the resonant converter in the load switching working condition comprises:

sequentially using the first current hysteresis loop and the second current hysteresis loop to control a secondary-side synchronous rectification power switch of the resonant converter, if the resonant converter is switched from full-load to no-load.

3. The synchronous rectification control method according to claim 2, wherein sequentially using the first current hysteresis loop and the second current hysteresis loop to control the secondary-side synchronous rectification power switch of the resonant converter comprises:

controlling the secondary-side synchronous rectification power switch to be turned off if the output current is less than or equal to the first lower limit value;

controlling the secondary-side synchronous rectification power switch to be turned on if a turn-off time of the secondary-side synchronous rectification power switch is greater than a time threshold; and controlling the secondary-side synchronous rectification power switch to be turned off if the output current is less than or equal to the second lower limit value.

4. The synchronous rectification control method according to claim 3, wherein the time threshold is less than or equal to a time corresponding to a difference between the first lower limit value and the second upper limit value.

5. The synchronous rectification control method according to claim 3, further comprising:

if the output current is in a region between the first lower limit value and the second upper limit value, first turning off the secondary-side synchronous rectification power switch, then turning on the secondary-side synchronous rectification power switch after a delay of a preset duration, and entering the control of the second current hysteresis loop.

6. The synchronous rectification control method according to claim 1, wherein using the first current hysteresis loop and the second current hysteresis loop to control the synchronous rectification of the resonant converter in a load switching working condition further comprises:

sequentially using the second current hysteresis loop and the first current hysteresis loop to control a secondary-side synchronous rectification power switch of the resonant converter, if the resonant converter is switched from no-load to full-load.

7. The synchronous rectification control method according to claim 6, further comprising:

when the resonant converter is in a working condition of switching from no-load to full-load, controlling the secondary-side synchronous rectification power switch to be turned on if the output current of the resonant converter is greater than or equal to the second upper limit value; and along with a change of the output current, still controlling the secondary-side synchronous rectification power switch to be turned on if the output current is greater than or equal to the first upper limit value.

8. The synchronous rectification control method according to claim 1, further comprising:

using the second current hysteresis loop to control a secondary-side synchronous rectification power switch of the resonant converter, if the resonant converter is in a non-load-switching working condition.

9. The synchronous rectification control method according to claim 1, further comprising:

shortening a sampling determination duration of the output current.

10. A synchronous rectification control method for a resonant converter, the method comprising:

obtaining an output current of the resonant converter;

obtaining a first parameter if the output current is greater than a first current threshold;

obtaining a second parameter if the output current is less than a second current threshold, the first current threshold being greater than the second current threshold, and the first parameter being greater than the second parameter;

establishing a first current hysteresis loop according to the first parameter and establishing a second current hysteresis loop according to the second parameter, wherein the first parameter comprises a first lower limit value and a first upper limit value, and the second parameter comprises a second upper limit value and a second lower limit value, the first lower limit value being less than the second current threshold;

using the first current hysteresis loop and the second current hysteresis loop to control synchronous rectification of the resonant converter in a load switching working condition;

sequentially using the first current hysteresis loop and the second current hysteresis loop to control a secondary-side synchronous rectification power switch of the resonant converter, if the resonant converter is switched from full-load to no-load; controlling the secondary-side synchronous rectification power switch to be turned off if the output current is less than or equal to the first lower limit value; controlling the secondary-side synchronous rectification power switch to be turned on if a turn-off time of the secondary-side synchronous rectification power switch is greater than a time threshold; since there is a delay in switching from the first current hysteresis loop to the second current hysteresis loop, in a region between the first lower limit value and the second upper limit value, first turning off the secondary-side synchronous rectification power switch, then turning on the secondary-side synchronous rectification power switch after a delay of a preset duration, and entering the control of the second current hysteresis loop; and controlling the secondary-side synchronous rectification power switch to be turned off if the output current is less than or equal to the second lower limit value;

sequentially using the second current hysteresis loop and the first current hysteresis loop to control the secondary-side synchronous rectification power switch of the resonant converter, if the resonant converter is switched from no-load to full-load; and when the resonant converter is in a working condition of switching from no-load to full-load, controlling the secondary-side synchronous rectification power switch to be turned on if the output current is greater than or equal to the second upper limit value; and with a change of the output current, still controlling the secondary-side synchronous rectification power switch to be turned on if the output current is greater than or equal to the first upper limit value.

11. The synchronous rectification control method according to claim 10, wherein the time threshold is less than or equal to a time corresponding to a difference between the first lower limit value and the second upper limit value.

12. The synchronous rectification control method according to claim 10, further comprising:

using the second current hysteresis loop to control a secondary-side synchronous rectification power switch of the resonant converter, if the resonant converter is in a non-load-switching working condition.

13. The synchronous rectification control method according to claim 10, further comprising:

shortening a sampling determination duration of the output current.

14. A non-transitory computer storage medium, storing a program instruction, the program instruction, when executed by a processor, implementing a synchronous rectification control method for a resonant converter;

the synchronous rectification control method comprising:

obtaining an output current of the resonant converter;

obtaining a first parameter if the output current is greater than a first current threshold;

obtaining a second parameter if the output current is less than a second current threshold, the first current threshold being greater than the second current threshold, and the first parameter being greater than the second parameter;

establishing a first current hysteresis loop according to the first parameter and establishing a second current hysteresis loop according to the second parameter; and using the first current hysteresis loop and the second current hysteresis loop to control synchronous rectification of the resonant converter in a load switching working condition, wherein the first parameter comprises a first lower limit value and a first upper limit value, and the second parameter comprises a second upper limit value and a second lower limit value, the first lower limit value being less than the second current threshold.

\* \* \* \* \*